United States Patent
Wang et al.

(10) Patent No.: US 11,821,518 B2
(45) Date of Patent: Nov. 21, 2023

(54) SOLUBLE METAL SEALING RING WITH CONTROLLABLE DISSOLUTION RATE AND PREPARATION PROCESS THEREOF

(71) Applicant: Southwest Petroleum University, Chengdu (CN)

(72) Inventors: Xiaohong Wang, Chengdu (CN); Yangang Jiang, Chengdu (CN); Jianchun Guo, Chengdu (CN); Tao Liu, Chengdu (CN); Shilei Xu, Chengdu (CN); Zishuo Li, Chengdu (CN); Yuanhua Lin, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 18/097,705

(22) Filed: Jan. 17, 2023

(65) Prior Publication Data
US 2023/0265923 A1  Aug. 24, 2023

(30) Foreign Application Priority Data

Jan. 26, 2022 (CN) .......................... 202210094409.9

(51) Int. Cl.
*F16J 15/08* (2006.01)
*C23C 4/129* (2016.01)
(Continued)

(52) U.S. Cl.
CPC ........... *F16J 15/0806* (2013.01); *C22C 21/14* (2013.01); *C22C 21/16* (2013.01); *C22C 21/18* (2013.01);
(Continued)

(58) Field of Classification Search
None
See application file for complete search history.

(56) References Cited

FOREIGN PATENT DOCUMENTS

| CN | 110512123 A | * 11/2019 |
| CN | 214697790 U | 11/2021 |

(Continued)

OTHER PUBLICATIONS

CNIPA, Notification of a First Office Action for CN202210094409.9, dated Aug. 10, 2022.
(Continued)

*Primary Examiner* — George Wyszomierski
*Assistant Examiner* — Janell C Morillo
(74) *Attorney, Agent, or Firm* — Zhigang Ma

(57) ABSTRACT

A soluble metal sealing ring with a controllable dissolution rate and preparation process thereof include an aluminum alloy sealing ring matrix and a composite coating coated on an outer surface of the aluminum alloy sealing ring matrix whose standard electrode potential is greater than −0.3 volts (V). The preparation process includes: (1) preparing a high-plastic aluminum alloy; (2) preparing the aluminum alloy sealing ring matrix by machining; (3) annealing the aluminum alloy sealing ring matrix; (4) mixing raw materials of the composite coating evenly; (5) preparing the composite coating on an outer surface of the aluminum alloy sealing ring matrix; (6) preparing holes. The soluble metal sealing ring solves problem that good sealing performance and good dissolving performance are difficult to obtain simultaneously in the existing product, and has advantages of good sealing performance, controllable dissolving rate, no blockage and others.

4 Claims, 1 Drawing Sheet

(51) Int. Cl.
　　　*C23C 4/134* 　　(2016.01)
　　　*C22C 21/16* 　　(2006.01)
　　　*C23C 4/067* 　　(2016.01)
　　　*C22C 21/14* 　　(2006.01)
　　　*C22C 21/18* 　　(2006.01)

(52) U.S. Cl.
　　　CPC .............. *C23C 4/067* (2016.01); *C23C 4/129* (2016.01); *C23C 4/134* (2016.01)

(56) References Cited

FOREIGN PATENT DOCUMENTS

| WO | WO-2017086955 A1 * | 5/2017 | ............. C22C 21/00 |
| WO | WO-2021096364 A1 * | 5/2021 | ......... E21B 33/1208 |

OTHER PUBLICATIONS

Southwest Petroleum University (Applicant), Reply to Notification of a First Office Action for CN202210094409.9, w/ replacement claims, dated Sep. 26, 2022.

Southwest Petroleum University (Applicant), Supplemental Reply to Notification of a First Office Action for CN202210094409.9, w/ (allowed) replacement claims, dated Sep. 30, 2022.

CNIPA, Notification to grant patent right for invention in CN202210094409.9, dated Oct. 17, 2022.

* cited by examiner

SOLUBLE METAL SEALING RING WITH CONTROLLABLE DISSOLUTION RATE AND PREPARATION PROCESS THEREOF

TECHNICAL FIELD

The disclosure relates to the technical field of downhole tools, in particular to a soluble metal sealing ring with a controllable dissolution rate and preparation process thereof.

BACKGROUND

Soluble bridge plug is a downhole tool used for temporary sealing in oil and gas wells, mainly including joints, slips, cones, sealing rings, etc. The sealing ring is a key component to ensure the sealing effect of the bridge plug. When the bridge plug is used, the bridge plug is lowered to a target position in an oil casing, and then pressure is applied to the bridge plug by certain means, so that the diameter of the sealing ring in the bridge plug is increased, and finally, an outer surface of the sealing ring is closely attached to an inner wall of the oil casing, thereby plugging the oil casing. The good sealing performance of the sealing ring is the key to ensure the success of fracturing operation. According to the fracturing conditions, the elongation of the sealing ring is generally required to be more than 35%, and the elongation in all directions should be basically equal, with the range less than 5%, to achieve good sealing performance of the sealing ring. After the fracturing operation, the soluble bridge plug including the sealing ring needs to be completely dissolved within 7-30 days. At present, other components of the soluble bridge plug except the sealing ring are usually prepared with soluble magnesium alloy, which can be completely dissolved within the required time.

At present, the commonly used soluble sealing ring of the bridge plug in China and abroad is mainly composed of a sealing ring made by a soluble polymer material, but the temperature resistance and pressure resistance of the sealing ring made by the soluble polymer material are poor, and it is easy to cause sealing failure due to high formation temperature or insufficient pressure during the fracturing operation; at the same time, dissolved products of the polymer sealing ring in the groundwater are flocculent, which is very easy to cause plugging of the oil casing. A soluble metal sealing ring is used to replace the sealing ring made by the soluble polymer material can effectively solve the problems of insufficient pressure bearing, poor temperature resistance and easy blockage of the sealing ring made by the soluble polymer material. At present, the common soluble metals are mainly magnesium based alloys and aluminum based alloys, but the plastic deformation ability of magnesium based alloys is poor, and the elongation is usually 10%-20%, which cannot meet the plastic requirements of the sealing ring; secondly, magnesium based alloy sealing rings usually use magnesium alloy extruded bars as raw materials, the extruded bars are cut into sheets by machining according to a set thickness, and then hollow the inside of the sliced bars to form a sealing ring. This forming process leads to obvious anisotropy of the magnesium based alloy sealing rings, uneven stress deformation in all directions during the fracturing operation, resulting in poor sealing or local necking fracture.

Aluminum has a face centered cubic structure with good plasticity. By adjusting the alloy composition, its elongation can reach more than 35%. However, aluminum alloy has poor solubility due to its surface covered with a dense oxide film. Therefore, the disclosure uses high-plastic aluminum alloy to prepare a sealing ring matrix, and a surface coating with extremely high corrosion potential is designed on a surface of the aluminum alloy sealing ring matrix. Before the bridge plug is set, the surface coating with the extremely high corrosion potential has good corrosion resistance, which can protect the sealing ring from corrosion. When setting, the high-plastic aluminum alloy sealing ring matrix will produce large plastic deformation, but the surface coating with the extremely high corrosion potential on the aluminum alloy sealing ring matrix has poor deformation ability, which will produce a lot of microcracks and cause a lot of galvanic corrosion of "big cathode-small anode" structure between the surface coating with the extremely high corrosion potential and the aluminum alloy matrix after the large plastic deformation, thereby accelerating the corrosion of aluminum alloy sealing ring matrix.

SUMMARY

For the shortcomings of the prior art, the disclosure provides a soluble metal sealing ring with the controllable dissolution rate and preparation process thereof. The sealing ring not only has the characteristics of large elongation and almost equal elongation in all directions, but also can adjust the dissolution rate of the sealing ring by adjusting composition and porosity of the surface coating, which has advantages of large elongation, controllable dissolution rate, low cost, etc.

To achieve the above purpose, the disclosure realizes the purpose by following technical solutions: a soluble metal sealing ring with the controllable dissolution rate and preparation process thereof, where a structure of the soluble metal sealing ring includes a high-plastic aluminum alloy sealing ring matrix and a composite coating coated on an outer surface of the high-plastic aluminum alloy sealing ring matrix.

In an embodiment, main components of the high-plastic aluminum alloy sealing ring matrix include aluminum, copper, and magnesium. Specifically, the components of the high-plastic aluminum alloy sealing ring matrix are as follows: copper whose content is in a range of 0.03% to 0.80%, magnesium whose content is in a range of 0.03% to 0.40%, silicon whose content is 0.20%, iron whose content is 0.25%, manganese whose content is 0.03%, zinc whose content is 0.04%, titanium whose content is 0.03%, and the aluminum is as the balance.

In an embodiment, the aluminum alloy sealing ring matrix as a whole includes a sealing ring matrix upper layer, a sealing ring matrix middle layer, and a sealing ring matrix lower layer; and inner diameters of them are the same, an outer diameter of the sealing ring matrix lower layer is the largest, and an outer diameter of the sealing ring matrix middle layer is the smallest.

In an embodiment, a thickness of the composite coating is in a range of 5-50 micrometers (pin), a standard electrode potential of the composite coating is greater than −0.3 volts (V), and the composite coating includes graphite and one or more metal components with a standard electrode potential greater than −0.3 V.

In an embodiment, the thickness of the composite coating is in a range of 8-30 μm.

In an embodiment, the components of the composite coating are the graphite and nickel.

In an embodiment, in the composite coating that includes the graphite and nickel while the standard electrode potential of the composite coating is greater than −0.3 V, a volume fraction of the graphite is in a range of 10% to 35%, and a volume fraction of the nickel is in a range of 65% to 90%.

In an embodiment, the composite coating is provided with multiple holes with a diameter less than 0.5 mm.

The disclosure provides the soluble metal sealing ring with the controllable dissolution rate and preparation process thereof, and the preparation process includes following steps:

step 1: melting an aluminum alloy and casting the melted aluminum alloy into an aluminum alloy ingot according to a chemical composition of the high-plastic aluminum alloy, and then homogenizing the aluminum alloy ingot and rolling the aluminum alloy ingot into an aluminum alloy rolled plate;

step 2: cutting the aluminum alloy rolled plate according to designed geometric dimensions, and processing the cut aluminum alloy rolled plate to obtain an aluminum alloy sealing ring matrix with the required shape and size by machining;

step 3: annealing the aluminum alloy sealing ring matrix at a temperature of 300-400° C. with duration of 25-40 minutes (min) to eliminate the anisotropy of the aluminum alloy sealing ring matrix due to rolling textures in the original aluminum alloy rolled plate, thereby making elongations of aluminum alloy sealing ring matrix in all directions be almost equal;

step 4: determining component types and percentage contents of raw materials of a composite coating according to component requirements of the composite coating, and mixing the raw materials evenly according to a designed proportion;

step 5: performing a surface sandblasting treatment on the aluminum alloy sealing ring matrix; and step 6: preparing the composite coating on an outer surface of the aluminum alloy sealing ring matrix by one of flame spraying and plasma spraying, and processing multiple holes with a diameter less than 0.5 mm on a surface of the composite coating by one of mechanical and chemical methods.

In an embodiment, in the step 4, the composite coating uses a nickel-coated graphite powder as the raw material, and the raw material includes graphite and nickel. A volume fraction of the graphite is in a range of 10%-35%, and a volume fraction of the nickel is in a range of 65%-90%.

Beneficial Effects of the Disclosure

For defects of the prior art and the requirements of the fracturing operation on the sealing, solubility and pressure bearing capacity of the sealing ring of the soluble bridge plug, the disclosure creatively designs a soluble metal sealing ring with the controllable dissolution rate and preparation process thereof by combining the alloy composition design, structural design and the principle of galvanic corrosion. The sealing ring matrix is prepared from the high-plastic aluminum alloy, and the anisotropy of the aluminum alloy sealing ring matrix is eliminated through annealing treatment, so that the elongations in all directions are almost equal, and the sealing performance of the sealing ring is guaranteed. By designing the aluminum alloy sealing ring matrix with the same inner diameter, the outer diameter of the sealing ring matrix lower layer is the largest, and the outer diameter of the sealing ring matrix middle layer is the smallest, and thus the geometric structure ensures the pressure bearing capacity of the sealing ring. On this basis, the dissolution rate of the aluminum alloy sealing ring matrix is accelerated by coating a composite coating with a standard electrode potential greater than −0.3 V on the outer surface of the aluminum alloy sealing ring matrix, and by forming a large number of galvanic corrosion of "big cathode-small anode" structure with the aluminum alloy sealing ring matrix through microcracks or local wear on the surface of the composite coating during setting, the dissolution rate of aluminum alloy sealing ring matrix is adjusted by adjusting the number of prefabricated holes on the coating, thus solving the problem that it is difficult to have both good sealing performance and good dissolution performance of soluble sealing rings in existing products. The soluble metal sealing ring of the disclosure has advantages of good sealing performance, strong pressure bearing, good temperature resistance, controllable dissolution rate, simple preparation, low cost, etc. At the same time, the soluble product of the soluble metal sealing ring of the disclosure is water-soluble metal ions. The composite coating on the surface of the aluminum alloy sealing ring matrix will be separated into microblocks with very small diameter after the aluminum alloy sealing ring matrix is dissolved, and will be discharged with the flowback fluid, without causing blockage.

DESCRIPTION OF REFERENCE NUMERALS

1—central shaft; 2—upper joint; 3—soluble slip; 4—slip tooth; 5—soluble metal sealing ring; 6—soluble ball base; 7—lower joint; 8—aluminum alloy sealing ring matrix; 81—sealing ring matrix upper layer; 82—sealing ring matrix middle layer; 83—sealing ring matrix lower layer; 9—composite coating.

DETAILED DESCRIPTION OF EMBODIMENTS

In order to make the purpose, technical solutions and advantages of the disclosure clearer, the disclosure is further described in detail below in combination with the drawings and embodiments. It should be noted that the specific embodiments described here are only used to better explain the disclosure, and are part of the embodiments of the disclosure, not all of them, and the specific embodiments are not used to limit the disclosure.

Figure 1:
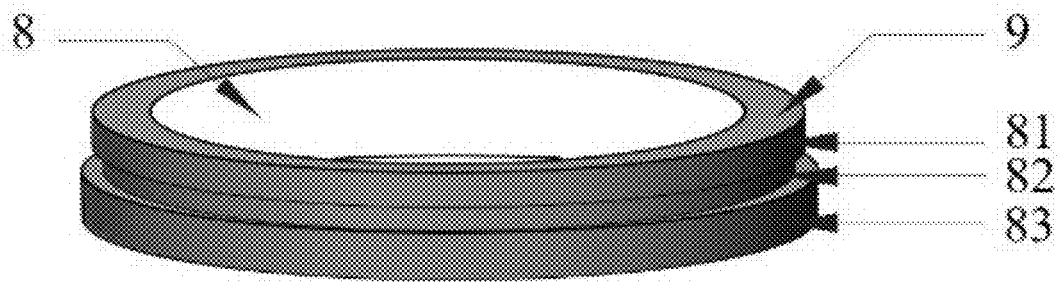
FIG. 1 is a structural diagram of a soluble metal sealing ring of the disclosure.
Figure 2:
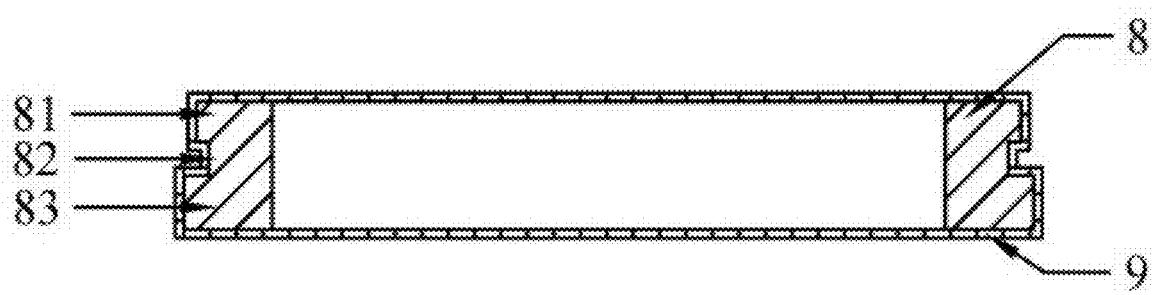
FIG. 2 is a sectional view of the soluble metal sealing ring of the disclosure.

As shown in FIG. 1 and FIG. 2, a soluble metal sealing ring with the controllable dissolution rate and preparation thereof, which includes an annular aluminum alloy sealing ring matrix 8, the aluminum alloy sealing ring matrix 8 includes a sealing ring matrix upper layer 81, a sealing ring matrix middle layer 82, and a sealing ring matrix lower layer 83. An outer surface of the aluminum alloy sealing ring matrix 8 is coated with a composite coating 9.

As shown in FIG. 1 and FIG. 2, main components of the aluminum alloy sealing ring matrix 8 include aluminum, copper, and magnesium. Specifically, the components of the aluminum alloy sealing ring matrix 8 are as follows: copper whose content is 0.28%, magnesium whose content is 0.08%, silicon whose content is 0.20%, iron whose content is 0.25%, manganese whose content is 0.03%, zinc whose content is 0.04%, titanium whose content is 0.03%, and the aluminum as the balance.

As shown in FIG. 1 and FIG. 2, the aluminum alloy sealing ring matrix 8 is a whole structure, the sealing ring matrix upper layer 81, the sealing ring matrix middle layer 82, and the sealing ring matrix lower layer 83 have the same inner diameter. An outer diameter of the sealing ring matrix lower layer 83 is the largest, an outer diameter of the sealing ring matrix middle layer 82 is the smallest, the outer diameter of the sealing ring matrix middle layer 82 is 94% of the outer diameter of the sealing ring matrix lower layer 83, and the outer diameter of the sealing ring matrix upper layer 81 is the second largest and is 97% of the outer diameter of the sealing ring matrix lower layer 83. The structure can reduce the external force required for setting and improve the pressure bearing capacity of the soluble metal sealing ring.

As shown in FIG. 1 and FIG. 2, a standard electrode potential of the composite coating 9 is greater than −0.3 V, the composite coating 9 includes two components that are graphite and nickel, a volume fraction of the graphite is 20%, and a volume fraction of the nickel is 80%. A thickness of the composite coating 9 is 20 μm.

As shown in FIG. 1 and FIG. 2, 100 holes with a diameter of 0.4 mm are uniformly distributed on the composite coating 9.

The disclosure provides the soluble metal sealing ring with the controllable dissolution rate and preparation process thereof, and the preparation process includes following steps:
   step 1: melting an aluminum alloy and casting the melted aluminum alloy into an aluminum alloy ingot according to a chemical composition of the high-plastic aluminum alloy, and then homogenizing the aluminum alloy ingot and rolling the aluminum alloy ingot into an aluminum alloy rolled plate;
   step 2: cutting the aluminum alloy rolled plate according to designed geometric dimensions, and processing the cut aluminum alloy rolled plate to obtain an aluminum alloy sealing ring matrix 8 with the required shape and size by machining;
   step 3: annealing the aluminum alloy sealing ring matrix 8 at a temperature of 340° C. with 30 min, elongations of the annealed aluminum alloy sealing ring matrix 8 in all directions being almost equal and above 35%;
   step 4: determining a raw material of the composite coating being a nickel-coated graphite powder, and a volume fraction of the graphite being 20%, and a volume fraction of the nickel being 80%, mixing the graphite and the nickel evenly according to a proportion;
   step 5: performing a surface sandblasting treatment on the aluminum alloy sealing ring matrix 8; and
   step 6: preparing the composite coating 9 on an outer surface of the aluminum alloy sealing ring matrix 8 by one of flame spraying and plasma spraying, and processing 100 holes with a diameter of 0.4 mm on a surface of the composite coating 9 by one of mechanical and chemical methods.

The disclosure is further described in combination with specific embodiments.

Figure 3:
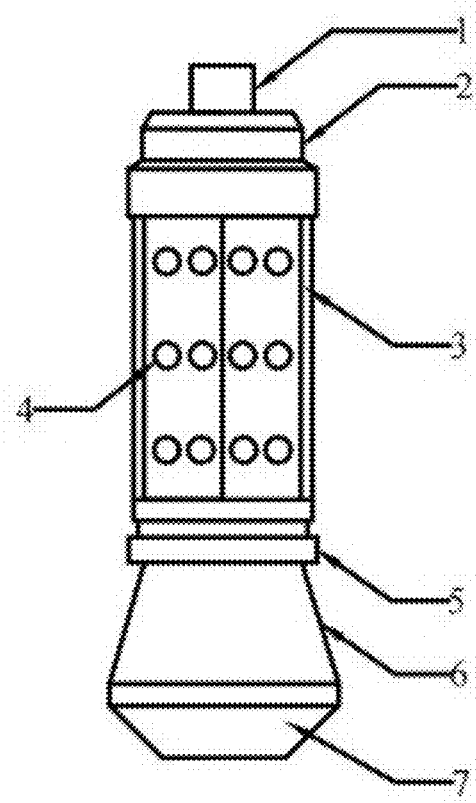
FIG. 3 is a schematic diagram of the soluble bridge plug tooling assembled in an embodiment of the disclosure.

As an embodiment of the disclosure, the obtained soluble metal sealing ring 5 is installed on a soluble bridge plug tooling, and its structure is shown in FIG. 3.

As shown in FIG. 3, FIG. 3 is a schematic diagram of the soluble metal sealing ring with the controllable dissolution rate assembled on the soluble bridge plug tooling, a central shaft 1 is included. An upper joint 2 is installed on the central shaft 1, a soluble slip 3 is installed below the upper joint 2, a slip tooth 4 is embedded on the soluble slip 3, a soluble metal sealing ring 5 is installed below the soluble slip 3, a soluble ball base 6 is installed below the soluble metal sealing ring 5, and a lower joint 7 is installed below the soluble ball base 6.

As shown in FIG. 3, except the slip tooth 4 and the soluble metal sealing ring 5, other parts of the soluble bridge plug tooling are made of soluble magnesium alloy. Specifically, the slip tooth 4 is made of a high-hardness ceramic material, and the soluble metal sealing ring 5 includes an aluminum alloy sealing ring matrix 8 and a composite coating 9.

As shown in FIG. 3, the soluble bridge plug tooling is a common structure in the prior art. Here, a relevant embodiment of the soluble metal sealing ring 5 will be described in detail.

As shown in FIG. 3, at the beginning of setting, an axial pressure of 20 megapascals (MPa) is applied on the soluble bridge plug tooling to make the soluble metal sealing ring 5 subject to the axial pressure and slide along the soluble ball base 6, so that the axial pressure can be converted into radial pressure, thus causing the soluble metal sealing ring 5 to start plastic deformation of outward expansion, and finally an outer surface of the soluble metal sealing ring 5 is closely attached to an inner wall of an oil casing, the plastic deformed soluble metal sealing ring 5 fills a gap between the soluble metal sealing ring 5 and the inner wall of the oil casing to achieve a sealing effect.

As shown in FIG. 3, when the soluble metal sealing ring 5 is subjected to an external force, plastic deformation mainly occurs on the aluminum alloy sealing ring matrix 8. Among them, the sealing ring matrix lower layer 83 deforms preferentially, which drives the sealing ring matrix middle layer 82 and the sealing ring matrix upper layer 81 to deform, thereby making the aluminum alloy sealing ring matrix 8 to slide along the soluble ball base 6 and expand outward. An outer diameter of the aluminum alloy sealing ring matrix 8 continues to increase, the setting is completed until the outer surface of the soluble metal sealing ring 5 is against the inner wall of the oil casing.

As shown in FIG. 3, the elongation of the composite coating 9 on an outer surface of the aluminum alloy sealing ring matrix 8 is low. The aluminum alloy sealing ring matrix 8 undergoes large plastic deformation during the setting process, which results in a large number of microcracks on the composite coating 9 coated on the outer surface of the aluminum alloy sealing ring matrix 8; at the same time, the outer surface of the aluminum alloy sealing ring matrix 8 with the large plastic deformation contacts the oil casing and causes friction, and the composite coating 9 on the outer surface of the aluminum alloy sealing ring matrix 8 is worn locally. The aluminum alloy exposed at the microcracks, local wear and prefabricated holes on the surface of composite coating 9 has low standard electrode potentials and small areas, and standard electrode potentials of the nickel and graphite in the surrounding area of the composite coating 9 are high, and the surrounding area (i.e., coating area) of the composite coating 9 is large. Under the condition of formation water containing chloride ions and formation temperature, the galvanic corrosion of "big cathode-small anode" structure is formed, which accelerates the dissolution of aluminum alloy sealing ring matrix 8, and dissolved products are discharged with flowback fluid.

Under the condition of formation water containing chloride ions and formation temperature, the thickness of composite coating 9 is only 20 μm. In addition, 100 holes and a large number of microcracks are distributed on the composite coating 9, when the aluminum alloy sealing ring matrix 8 is dissolved, the composite coating 9 attached to the aluminum alloy sealing ring matrix 8 will be separated into small pieces and will not cause blockage as the flowback fluid is discharged.

In the description of the disclosure, it is to be noted that orientation or position relationships indicated by terms "below", "outward", "axial", "radial" and others are based on the orientation or position relationships shown in the attached drawings only for the convenience of describing the disclosure and simplifying the description, rather than indicating or implying that the device or element referred must have a specific orientation, be constructed and operated in a specific orientation. Therefore, these terms cannot be understood as a limitation of the disclosure. The specific meaning of the above terms in the disclosure can be understood by those ordinary skilled in the art in specific cases.

Although the embodiments of the disclosure have been shown and described, it can be understood for those ordinary skilled in the art that these embodiments can be diversified, modified, replaced and modified without departing from the principle and spirit of the disclosure. The protection scope of the disclosure is defined by the appended claims and their equivalents.

What is claimed is:

1. A soluble metal sealing ring with a controllable dissolution rate, wherein the soluble metal sealing ring (5) comprises an aluminum alloy sealing ring matrix (8) and a composite coating (9) coated on an outer surface of the aluminum alloy sealing ring matrix (8), a material used in the aluminum alloy sealing ring matrix (8) is an aluminum alloy that is annealed at a temperature of 300-400 Celsius degree (° C.) for 25-40 minutes, a thickness of the composite coating (9) is in a range of 5-50 micrometers (μm), and the composite coating (9) comprises graphite and one or more metal components with a standard electrode potential greater than −0.3 volts (V);

wherein components of the aluminum alloy are as follows: copper whose content is in a range of 0.03% to 0.80%, magnesium whose content is in a range of 0.03% to 0.40%, silicon whose content is 0.20%, iron whose content is 0.25%, manganese whose content is 0.03%, zinc whose content is 0.04%, titanium whose content is 0.03%, and aluminum as the balance; and wherein the aluminum alloy sealing ring matrix (8) comprises a sealing ring matrix upper layer (81), a sealing ring matrix middle layer (82), and a sealing ring matrix lower layer (83); the sealing ring matrix upper layer (81), the sealing ring matrix middle layer (82), and the sealing ring matrix lower layer (83) form a whole with a same inner diameter; an outer diameter of the sealing ring matrix lower layer (83) is the largest, an outer diameter of the sealing ring matrix middle layer (82) is the smallest, the outer diameter of the sealing ring matrix middle layer (82) is 94% of the outer diameter of the sealing ring matrix lower layer (83), and the outer diameter of the sealing ring matrix upper layer (81) is 97% of the outer diameter of the sealing ring matrix lower layer (83).

2. The soluble metal sealing ring with the controllable dissolution rate according to claim 1, where the composite coating (9) comprises the graphite and nickel, a volume fraction of the graphite is in a range of 10% to 35%, and a volume fraction of the nickel is in a range of 65% to 90%.

3. The soluble metal sealing ring with the controllable dissolution rate according to claim 1, wherein a surface of the composite coating (9) is provided with multiple holes with a diameter less than 0.5 mm processed by a mechanical method or a chemical method.

4. The soluble metal sealing ring with the controllable dissolution rate according to claim 1, wherein the composite coating (9) is prepared by flame spraying or plasma spraying.

* * * * *